United States Patent
Takamoto et al.

(10) Patent No.: US 10,079,967 B2
(45) Date of Patent: Sep. 18, 2018

(54) IRIS AUTHENTICATION APPARATUS AND ELECTRONIC DEVICE

(71) Applicant: FUJITSU LIMITED, Kawasaki-shi, Kanagawa (JP)

(72) Inventors: Kenshi Takamoto, Inagi (JP); Yuji Takemoto, Kawasaki (JP); Masaya Yasue, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 214 days.

(21) Appl. No.: 14/989,255

(22) Filed: Jan. 6, 2016

(65) Prior Publication Data
US 2016/0253558 A1 Sep. 1, 2016

(30) Foreign Application Priority Data
Feb. 27, 2015 (JP) .................. 2015-039508

(51) Int. Cl.
*H04N 5/225* (2006.01)
*H04N 5/235* (2006.01)
*G06K 9/00* (2006.01)
*G06K 9/20* (2006.01)

(52) U.S. Cl.
CPC ......... *H04N 5/2257* (2013.01); *H04N 5/2252* (2013.01); *H04N 5/2256* (2013.01)

(58) Field of Classification Search
CPC .. H04N 5/2257; H04N 5/2252; H04N 5/2256; H04N 5/2354; G06K 9/00604; G06K 9/2027
USPC ............................................... 348/78
See application file for complete search history.

(56) References Cited

U.S. PATENT DOCUMENTS

| | | | | |
|---|---|---|---|---|
| 2002/0008768 A1* | 1/2002 | Takada | ............... | G06K 9/00604 348/333.03 |
| 2003/0174240 A1* | 9/2003 | Wada | .................. | H04N 5/2254 348/374 |
| 2004/0132491 A1* | 7/2004 | Kim | .................... | H04M 1/0218 455/556.1 |

(Continued)

FOREIGN PATENT DOCUMENTS

JP 2009199200 A * 9/2009
JP 2009205576 A * 9/2009

(Continued)

*Primary Examiner* — Christopher S Kelley
*Assistant Examiner* — Kathleen Walsh
(74) *Attorney, Agent, or Firm* — Westerman, Hattori, Daniels & Adrian, LLP

(57) ABSTRACT

An upper flexible board mounts a circuit. A lower flexible board is in a plate shape larger than a circuit mounting unit, is connected to the upper flexible board by a connecting part, is bent so that the connecting part faces a face opposite to a mounting face of the circuit of the upper flexible board, and includes an area from a bend that is generated by bending an area that does not overlap with the upper flexible board including a second end different from the connecting part to the second end. An iris illuminating LED is disposed on the same side as the upper flexible board in the area. An iris photographing camera is disposed at a position separated from the iris illuminating LED by a certain distance or more and acquires an image of an iris that has received light emission from the iris illuminating LED.

8 Claims, 17 Drawing Sheets

(56) References Cited

U.S. PATENT DOCUMENTS

| | | | | |
|---|---|---|---|---|
| 2007/0187701 A1* | 8/2007 | Goon | ............ | H01L 33/647 257/88 |
| 2013/0089240 A1* | 4/2013 | Northcott | ......... | G06K 9/00604 382/117 |
| 2013/0135513 A1* | 5/2013 | Choi | ............ | A61B 5/0077 348/335 |
| 2015/0062324 A1* | 3/2015 | Choi | ............ | G06K 9/2018 348/78 |
| 2016/0364561 A1* | 12/2016 | Lee | .......... | H04M 1/67 |

FOREIGN PATENT DOCUMENTS

| | | | | |
|---|---|---|---|---|
| JP | 2013-178899 | 9/2013 | | |
| WO | WO 2012174453 A2 * | 12/2012 | ......... | A61B 3/1216 |

\* cited by examiner

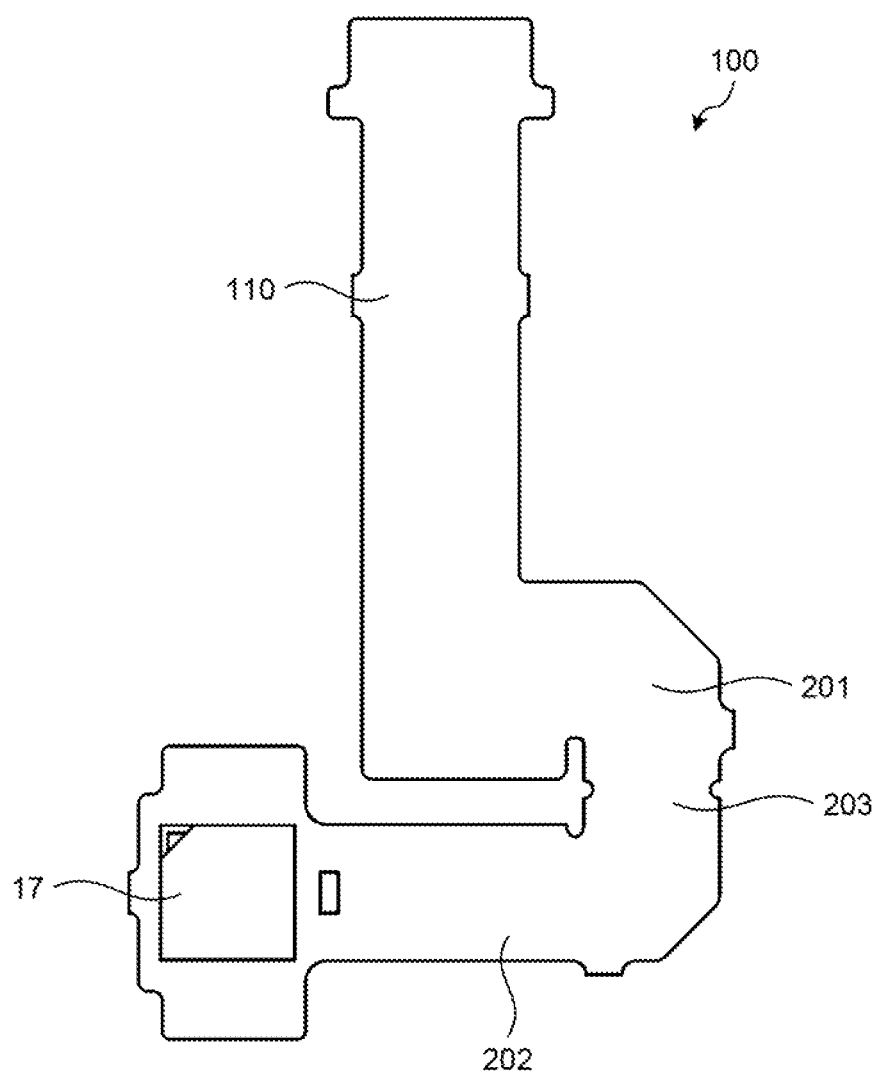

IRIS AUTHENTICATION APPARATUS AND ELECTRONIC DEVICE

CROSS-REFERENCE TO RELATED APPLICATION

This application is based upon and claims the benefit of priority of the prior Japanese Patent Application No. 2015-039508, filed on Feb. 27, 2015, the entire contents of which are incorporated herein by reference.

FIELD

The embodiment discussed herein is related to an iris authentication apparatus and an electronic device.

BACKGROUND

Recent years have seen a rapid proliferation of small-sized electronic devices such as tablet computers and smartphones. In many cases, these electronic devices handle valuable information related to users owing to their convenience capable of being carried at all times and safety.

Given these circumstances, measures have been taken that improve security of electronic devices by setting passwords and authenticating users, for example. However, in password-dependent authentication, passwords may leak by human error or malicious attack. When a password leaks, even a person other than a user himself/herself can login using the password, and valuable data stored in an electronic device may be stolen.

Under the circumstances, in order to improve security, biometric authentication technologies are developed that determine whether an individual is authenticated using human biological information such as a fingerprint, a palm print, a vein pattern, an iris, a face, or a voice. Among such biometric authentication technologies, iris authentication can be ideal biometric authentication for such reasons as being low in error rate, being capable of authenticating at a remote position, and being stable with less change.

There is a technology as a conventional technology of small-sized electronic devices that have different through holes through which light passes between an irradiation unit and a light-receiving unit of infrared rays for a proximity sensor in order to avoid reception of light reflected by a surface of screen glass or the like. Conventional technologies are described in Japanese Laid-open Patent Publication No. 2013-178899.

However, recent years' small-sized electronic devices implement various functions, and the small-sized electronic devices mount many apparatuses for implementing the various functions. Given this situation, the small-sized electronic devices require that components are densely mounted for the pursuit of further miniaturization. Also when an iris authentication apparatus is mounted on the small-sized electronic devices, it is desirable that functions and performances of the iris authentication apparatus be implemented with a casing reduced in size without impairing convenience of users. Given these circumstances, the iris authentication apparatus is disposed in a confined area together with components for implementing a plurality of functions in line with users' demands.

The iris authentication apparatus includes two members, that is, an iris photographing camera and an iris illuminating light emitting diode (LED). Specifically, authentication is performed using an image acquired by illuminating an eye by the iris illuminating LED and receiving its reflected light by the iris photographing camera.

The iris authentication apparatus having such a structure can perform accurate authentication by appropriately aligning an angle of view of the iris photographing camera and an illumination angle of the iris illuminating LED. In order to widen a range in which accurate authentication can be performed, that is, an iris authentication space, it is desirable that an overlap between the angle of view of the iris photographing camera and the illumination angle of the iris illuminating LED be wider. However, when the angle of view of the iris photographing camera and the iris illuminating LED are excessively brought close to each other in order to maximize the iris authentication space, a red-eye phenomenon may occur, and an iris image may fail to be accurately extracted.

In contrast, when the distance between the iris photographing camera and the iris illuminating LED is separated as a measure for red eye, the illumination range of the iris illuminating LED is deviated, and the iris authentication space is reduced.

Given these circumstances, the iris illuminating LED may be angled in order to increase the iris authentication space while separating the distance between the iris photographing camera and the iris illuminating LED. As a measure therefor, a different flexible board from that for another adjacent apparatus may be used. However, when a plurality of flexible boards are used, it is difficult to ensure a mounting space within a small-sized electronic device.

Given these circumstances, the same flexible board as that for the other adjacent apparatus may be used. However, when an area adjacent to the close apparatus is only bent and angled, the iris illuminating LED protrudes upward from the surface of the small-sized electronic device and is difficult to be housed in the small-sized electronic device. Given this situation, in order to enable the iris illuminating LED to be housed in the small-sized electronic device, confined bending can be performed to form a step. Thus the iris illuminating LED can be disposed while being angled as illustrated in FIG. 16. FIG. 16 is a schematic diagram of an arrangement state when bending is performed to angle the iris illuminating LED. However, the components are excessively close to each other, thus making bent angles of bends 91 and 92 acute, increasing a repulsive force to the iris illuminating LED owing to relation among the thickness, the rigidity, and the bent angles of the flexible board, and making it difficult to fix the iris illuminating LED stably to the small-sized electronic device.

SUMMARY

According to an aspect of an embodiment, an iris authentication apparatus includes: a circuit mounting unit on which a circuit is mounted; a plate-shaped member that is in a plate shape larger than the circuit mounting unit, is connected to the circuit mounting unit by a first end, is bent so that a connecting part with the circuit mounting unit faces a face opposite to a mounting face of the circuit of the circuit mounting unit, and includes a circuit mounting area from a bend which is generated by bending an area which does not overlap with the circuit mounting unit including a second end different from the first end to the second end; an iris illuminating light source that is disposed on the same side as the circuit mounting unit in the circuit mounting area; and an image acquisition unit that is disposed at a position separated from the iris illuminating light source by a certain distance or more and acquires an image of an iris that has received light emission from the iris illuminating light source.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is a back side plan view of the iris illuminating LED-mounted flexible board having the connection cable to the board;

DESCRIPTION OF EMBODIMENT

Preferred embodiments of the present invention will be explained with reference to accompanying drawings. The following example does not limit the iris authentication apparatus and the electronic device disclosed by the present application. Although a smartphone will be explained as a small-sized electronic device as an example, that is not limiting; the small-sized electronic device may be a tablet computer, for example.

Figure 1:
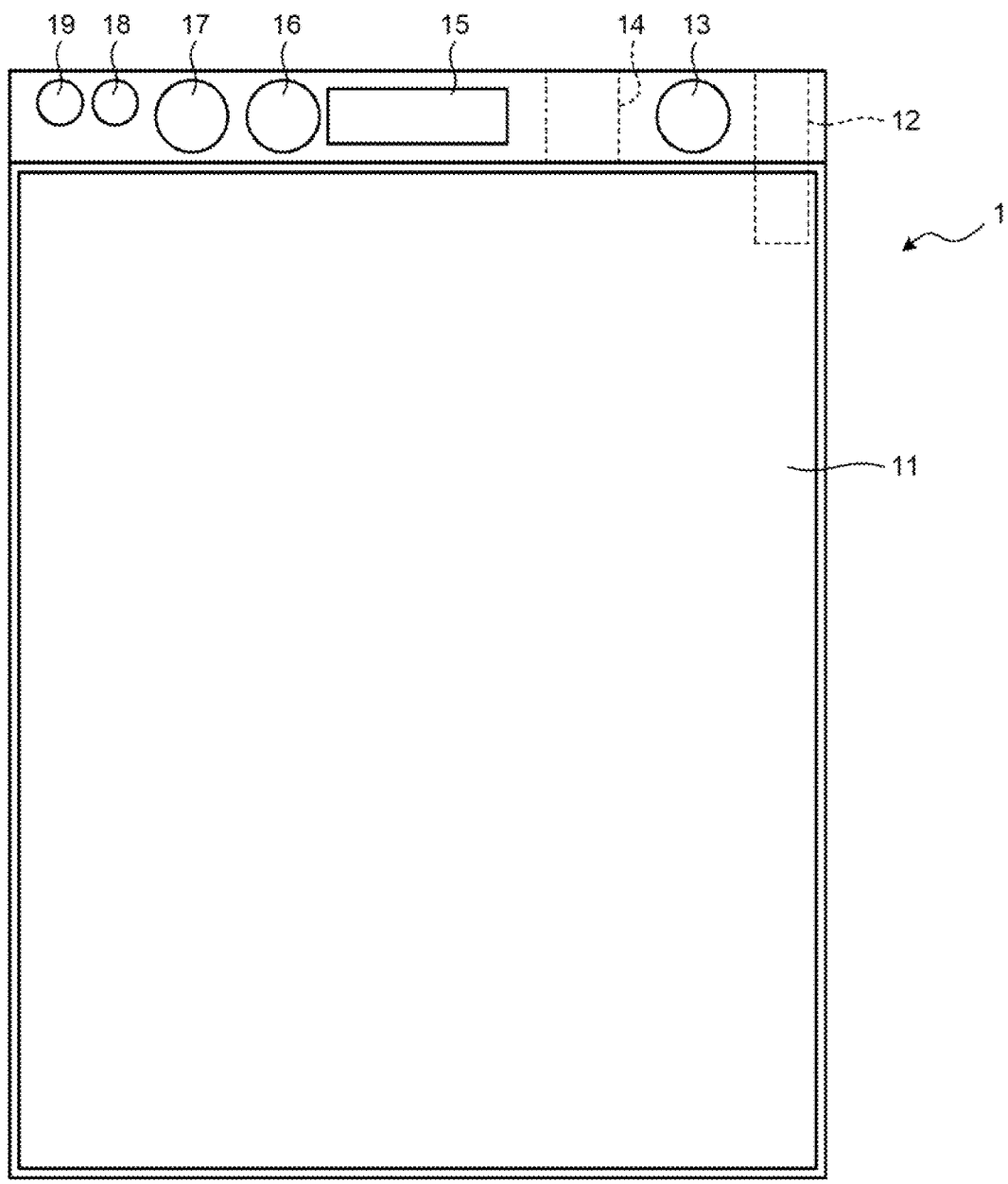
FIG. 1 is a front view of a smartphone according to an example.

FIG. 1 is a front view of a smartphone according to the example. This smartphone 1 according to the present example includes a display 11, an antenna (digital terrestrial antenna) 12 for digital terrestrial broadcasting, an iris photographing camera 13, an earphone connector 14, a receiver 15, an in-camera 16, an iris illuminating LED 17, a sensor 18, and a display LED 19. In FIG. 1, the parts illustrated by the dotted lines indicate parts that are actually invisible from the front.

The display 11 is a display apparatus that displays input telephone numbers, messages of incoming notification, or the like. The display 11 displays a photographing state of an iris of a user in the iris authentication.

The antenna 12 for digital terrestrial broadcasting is an antenna for receiving digital terrestrial broadcasting. The earphone connector 14 is a connecter into which an earphone for enabling the user to listen to voices output from the smartphone 1 is inserted.

The receiver 15 outputs voices of a person at the other end of the line when performing voice communication using the smartphone 1. The in-camera 16 is a photographing camera when normal photographing is performed using the smartphone 1.

The sensor 18 is a proximity sensor for sensing proximity of the head of the user to the smartphone 1 or an illumination sensor for sensing illumination around the smartphone 1, for example. The display LED 19 is an LED for indicating a status of the smartphone 1 such as during charging.

The iris photographing camera 13 is a photographing apparatus for acquiring an image for authentication by photographing an iris in the iris authentication. The iris photographing camera 13 corresponds to an example of an "image acquisition unit." The iris illuminating LED 17 is a light source for illuminating an eye of the user at the time of photographing the iris in the iris authentication. The iris illuminating LED 17 corresponds to an example of an "iris illuminating light source."

In other words, the iris photographing camera 13 photographs the iris of the user illuminated by the iris illuminating LED 17. The iris authentication is performed using an image acquired by the iris photographing camera 13.

Although not illustrated, the smartphone 1 includes an image authentication unit that performs image authentication by comparing the image photographed by the iris photographing camera 13 with images registered in advance.

Figure 2:
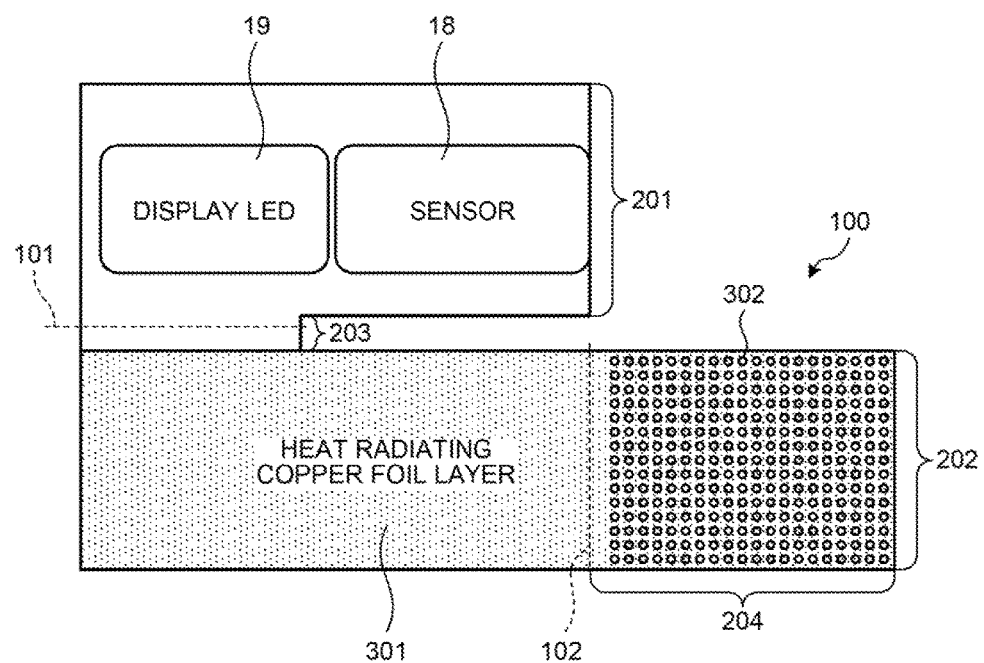
FIG. 2 is a front side plan view of an iris illuminating LED-mounted flexible board.
Figure 3:
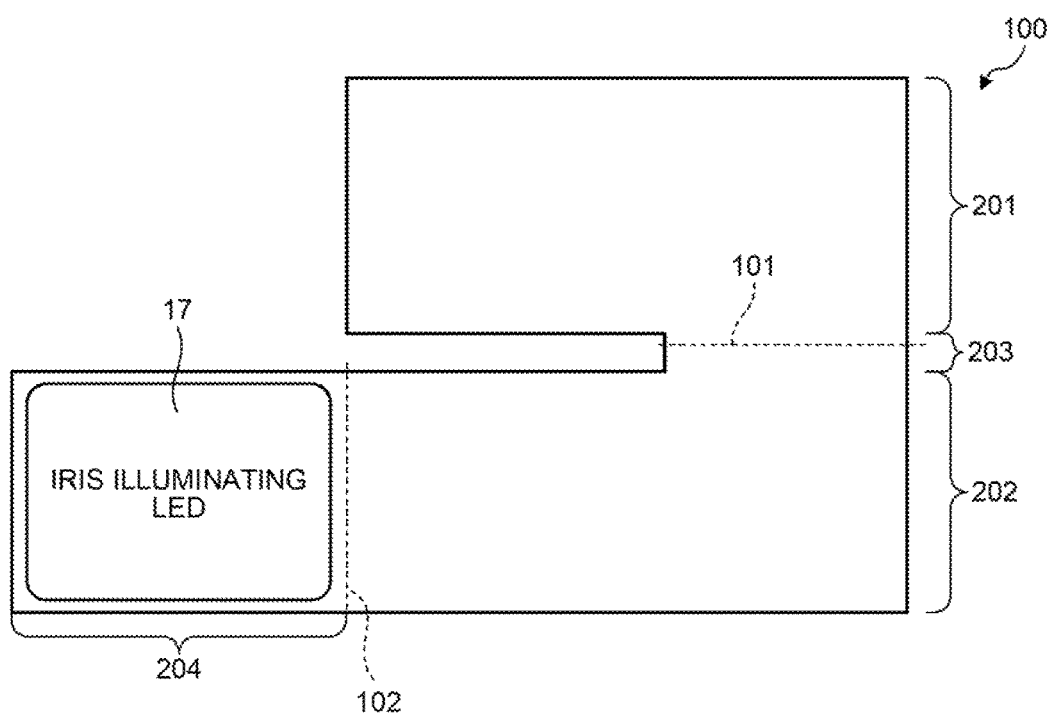
FIG. 3 is a back side plan view of the iris illuminating LED-mounted flexible board.

Next, a flexible board on which the iris illuminating LED 17, the sensor 18, and the display LED 19 are mounted will be explained with reference to FIGS. 2 and 3. The flexible board on which the iris illuminating LED 17, the sensor 18, and the display LED 19 are mounted will be referred to as an "iris illuminating LED-mounted flexible board" below. FIG. 2 is a front side plan view of the iris illuminating LED-mounted flexible board. FIG. 3 is a back side plan view of the iris illuminating LED-mounted flexible board. In this example, a face on which the sensor 18 and the display LED 19 are mounted of an iris illuminating LED-mounted flexible board 100 will be referred to as a front face, whereas a face on which the iris illuminating LED 17 is mounted will be referred to as a back face.

As illustrated in FIGS. 2 and 3, the iris illuminating LED-mounted flexible board 100 has a U-shape. The iris illuminating LED-mounted flexible board 100 is formed so that one plate extending along an opening of the U-shape is longer than the other. In other words, in FIGS. 2 and 3, the lower plate in the drawing is longer than the upper plate. The shorter plate will be referred to as an upper flexible board 201, whereas the longer plate will be referred to as a lower flexible board 202 below. FIGS. 2 and 3 illustrate the parts in a longitudinal range. A part at which the upper flexible board 201 and the lower flexible board 202 are connected to each other is referred to as a connecting part 203. The lower flexible board 202 and the connecting part 203 correspond to an example of a "plate-shaped member." The connecting part 203 corresponds to an example of a "first end."

As illustrated in FIG. 2, the sensor 18 and the display LED 19 are mounted on the front face of the upper flexible board 201. A heat radiating copper foil layer 301 is provided on the front face of the lower flexible board 202. The upper flexible board 201 corresponds to an example of a "circuit mounting unit."

When the iris illuminating LED-mounted flexible board 100 is mounted on the smartphone 1, the connecting part 203 is bent at a bend 101. By being bent at the bend 101, the back face of the upper flexible board 201 faces the back face of the lower flexible board 202. In other word, the bend 101 is a mountain fold in FIG. 2. With the back face of the upper flexible board 201 and the back face of the lower flexible board 202 facing each other, when the iris illuminating LED-mounted flexible board 100 is mounted on the smartphone 1, and furthermore, the lower flexible board 202 is bent at a bend 102 in a direction departing from the upper flexible board 201. In other words, the bend 102 is a mountain fold in FIG. 2. Vias 302 are formed in an area of the lower flexible board 202 that does not overlap with the back face of the upper flexible board 201 and the back face of the lower flexible board 202 facing each other, that is, in an area between the bend 102 and a distal end in the lower flexible board 202.

As illustrated in FIG. 3, the iris illuminating LED 17 is disposed at a place on the back side of the face on which the vias 302 are disposed on the back face of the iris illuminating LED-mounted flexible board 100. An area 204 on which the iris illuminating LED 17 is disposed corresponds to an example of a "circuit mounting area."

Figure 4:
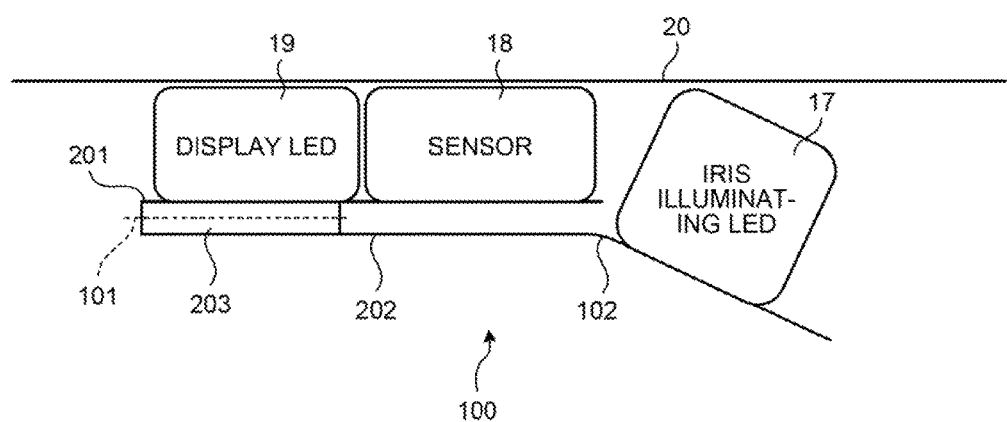
FIG. 4 is a schematic diagram of a state of the iris illuminating LED-mounted flexible board mounted on the smartphone.

A state of the iris illuminating LED-mounted flexible board 100 bent at the bend 101 and the bend 102 is a state as illustrated in FIG. 4. FIG. 4 is a schematic diagram of the state of the iris illuminating LED-mounted flexible board mounted on the smartphone.

The iris illuminating LED-mounted flexible board 100 bends at the bend 101, thereby directing the iris illuminating LED 17 to the same direction as the sensor 18 and the display LED 19. In other words, when mounted on the smartphone 1, the iris illuminating LED 17, the sensor 18, and the display LED 19 are all directed to a surface member 20 of the smartphone 1.

The lower flexible board 202 bends at the bend 102, thereby lowering the height of the iris illuminating LED 17 directed from the lower flexible board 202 to the surface member 20 and housing the iris illuminating LED 17 within the surface member 20.

The height from an area parallel to the surface member 20 of the lower flexible board 202 to the surface member 20 is the sum of the height from the upper flexible board 201 to the surface member 20 and a height created by the bending at the bend 101. In other words, the lower flexible board 202 is lower in height than the display LED 19 and the sensor 18 by the height created by the bending at the bend 101. Given this situation, the bending at the bend 102, which is provided to give an angle and house the iris illuminating LED 17 within the surface member 20, requires only a small bent angle. In this situation, when the iris illuminating LED-mounted flexible board 100 is bent, a repulsive force is generated in a direction opposite to the bending direction. Related to this point, the bend 102 has the small bent angle, in other words, has a large obtuse angle, and the repulsive force acting on the iris illuminating LED 17 can be reduced.

Figure 5:
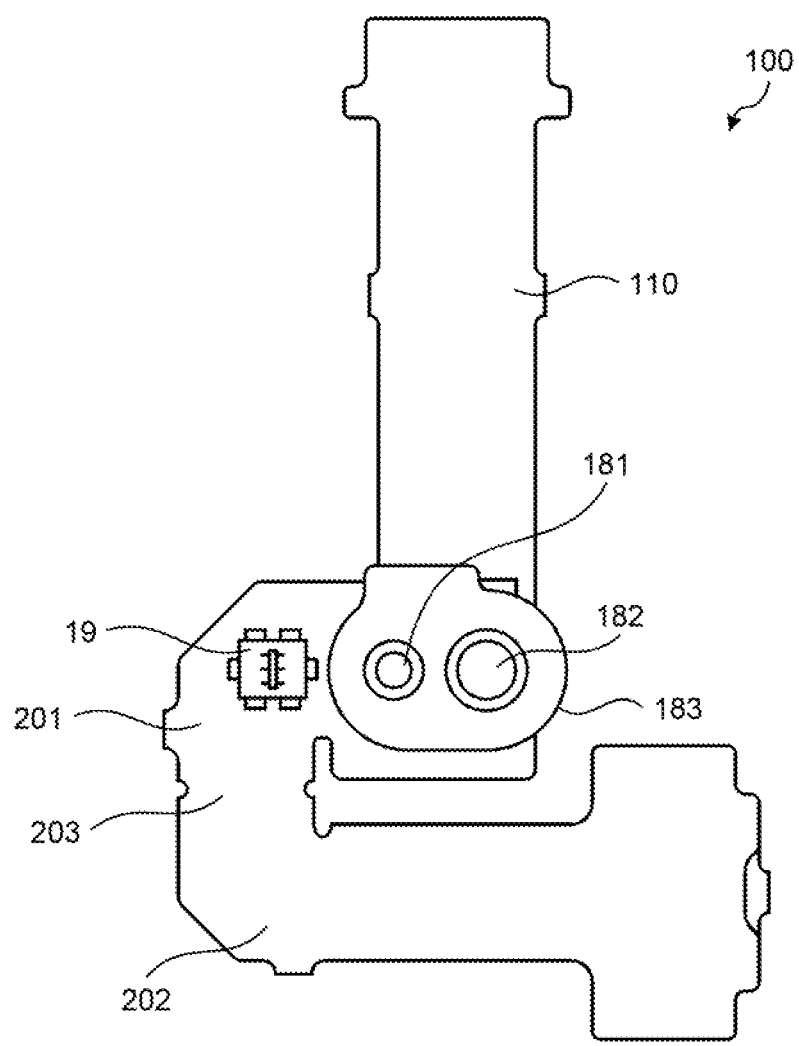
FIG. 5 is a front side plan view of the iris illuminating LED-mounted flexible board having a connection cable to a board.

Next, the iris illuminating LED-mounted flexible board 100 will be explained in more specifically with reference to FIGS. 5 and 6. FIG. 5 is a front side plan view of the iris illuminating LED-mounted flexible board having a connection cable to a board. FIG. 6 is a back side plan view of the iris illuminating LED-mounted flexible board having the connection cable to the board.

When actually mounted on the smartphone 1, the iris illuminating LED-mounted flexible board 100 is provided with a connection cable 110 extending from the upper flexible board 201 as illustrated in FIGS. 5 and 6, for example. Specifically, the connection cable 110 is connected to a board of the smartphone 1, thereby performing control to turn on and off the iris illuminating LED 17 in accordance with instructions from a central processing unit (CPU) of the smartphone 1, for example.

In FIGS. 5 and 6, a proximity sensor 181 and an illumination sensor 182 are mounted as the sensor 18. Furthermore, the sensor 18 is provided with a sensor cap 183 that covers the proximity sensor 181 and the illumination sensor 182. A combination of the proximity sensor 181, the illumination sensor 182, and the sensor cap 183 corresponds to the sensor 18.

Figure 7A:
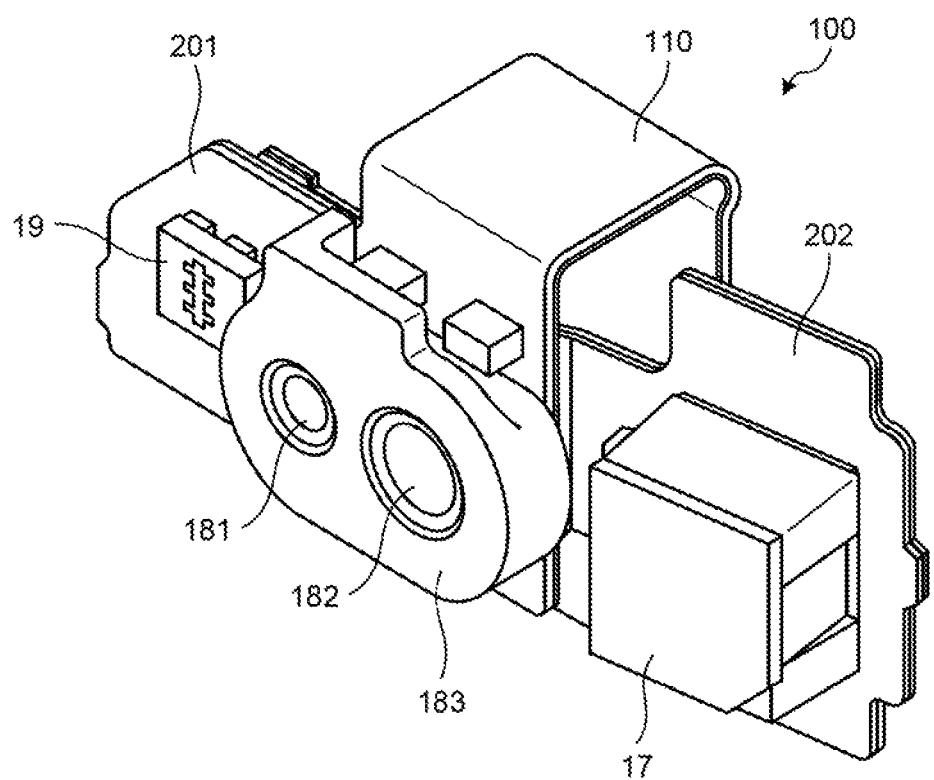
FIG. 7A is a perspective view of the iris illuminating LED-mounted flexible board in an incorporating shape viewed from an iris illuminating LED-mounted side.
Figure 7B:
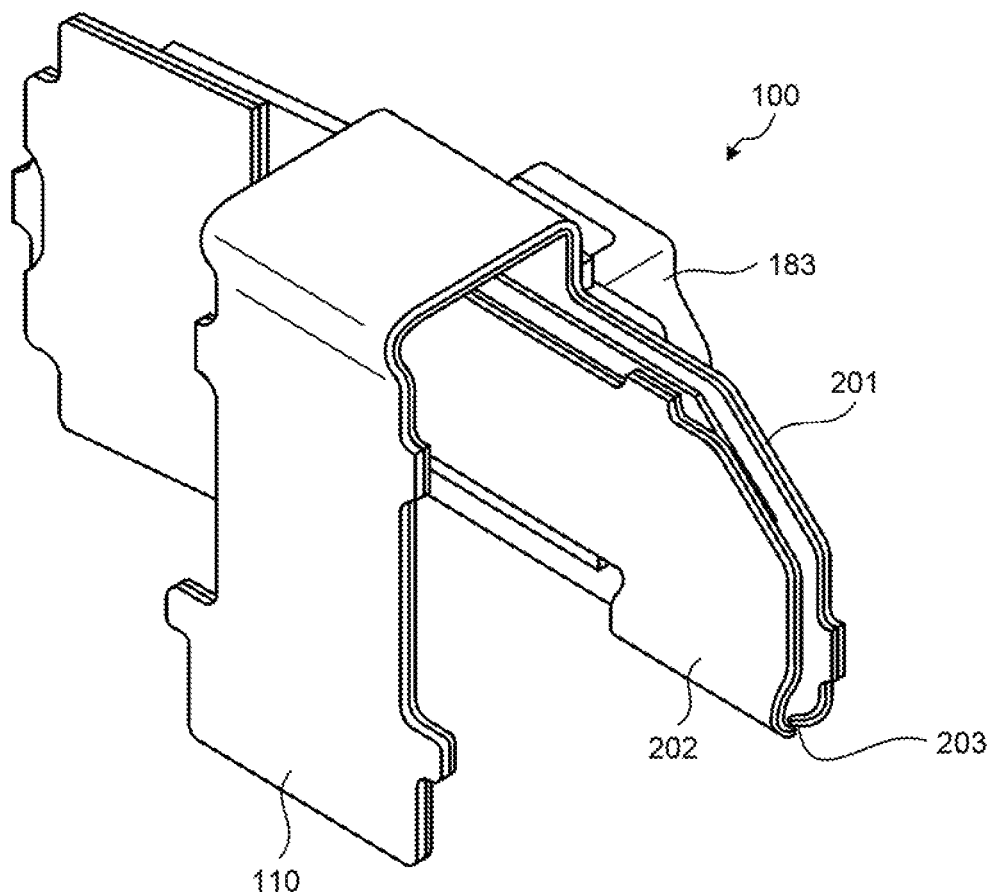
FIG. 7B is a perspective view of the iris illuminating LED-mounted flexible board in the incorporating shape viewed from the opposite side.

The iris illuminating LED-mounted flexible board 100 in FIGS. 5 and 6 is bent to have a form to be incorporated into the smartphone 1 corresponds to the iris illuminating LED-mounted flexible board 100 in FIGS. 7A and 7B. FIG. 7A is a perspective view of the iris illuminating LED-mounted flexible board in an incorporating shape viewed from an iris illuminating LED-mounted side. FIG. 7B is a perspective view of the iris illuminating LED-mounted flexible board in the incorporating shape viewed from the opposite side. The opposite side indicates a side on which the iris illuminating LED 17 is not mounted.

As illustrated in FIGS. 7A and 7B, being in the incorporating shape directs the iris illuminating LED 17, the proximity sensor 181, the illumination sensor 182, and the display LED 19 to the same direction. Furthermore, the connection cable 110 is bent to the back face of a mounting face of the iris illuminating LED 17, the proximity sensor 181, the illumination sensor 182, and the display LED 19.

Figure 8:
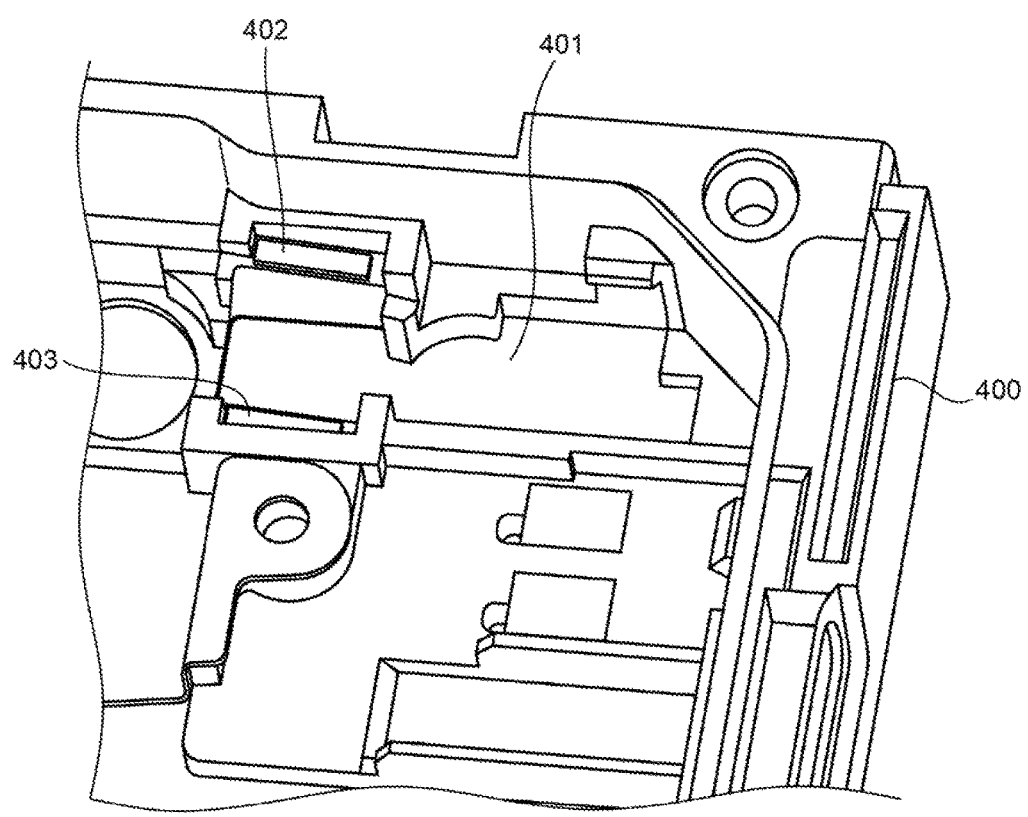
FIG. 8 is an enlarged perspective view of an incorporating part of a casing before the iris illuminating LED-mounted flexible board is incorporated.
Figure 9:
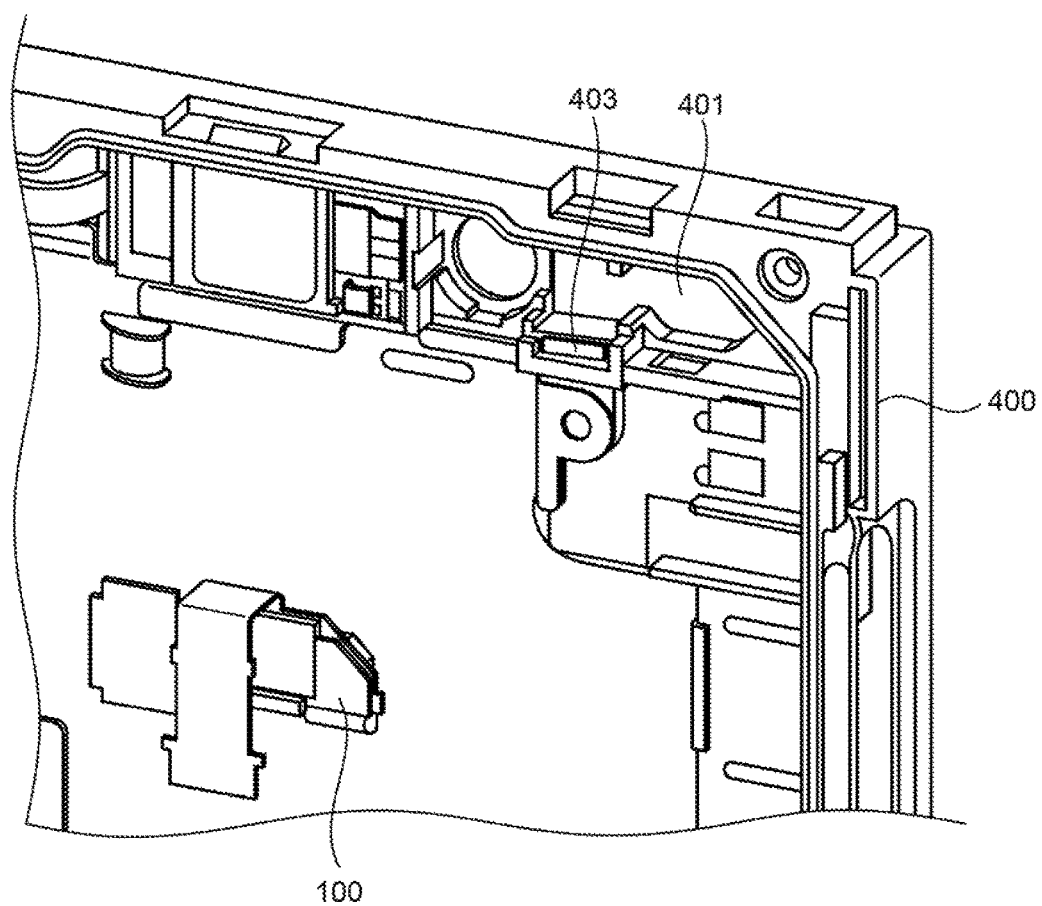
FIG. 9 is a perspective view of relation between the casing and the iris illuminating LED-mounted flexible board before being incorporated.
Figure 10:
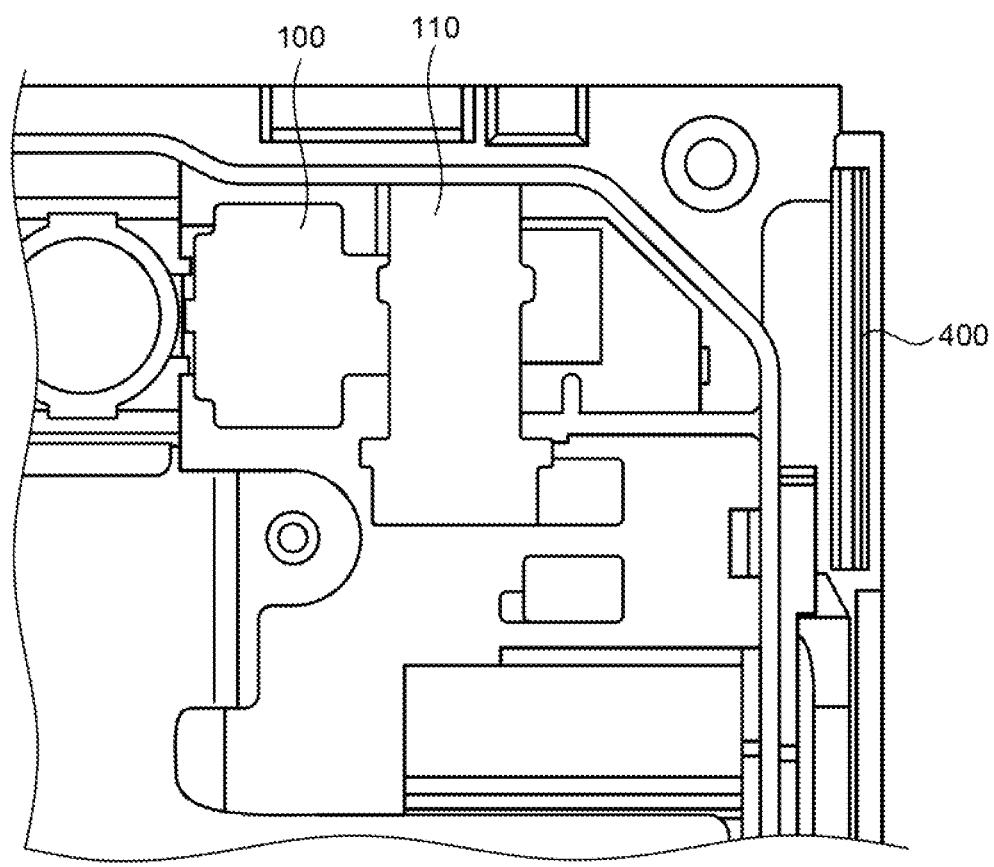
FIG. 10 is an enlarged plan view of the incorporating part with the iris illuminating LED-mounted flexible board incorporated into the casing.
Figure 11:
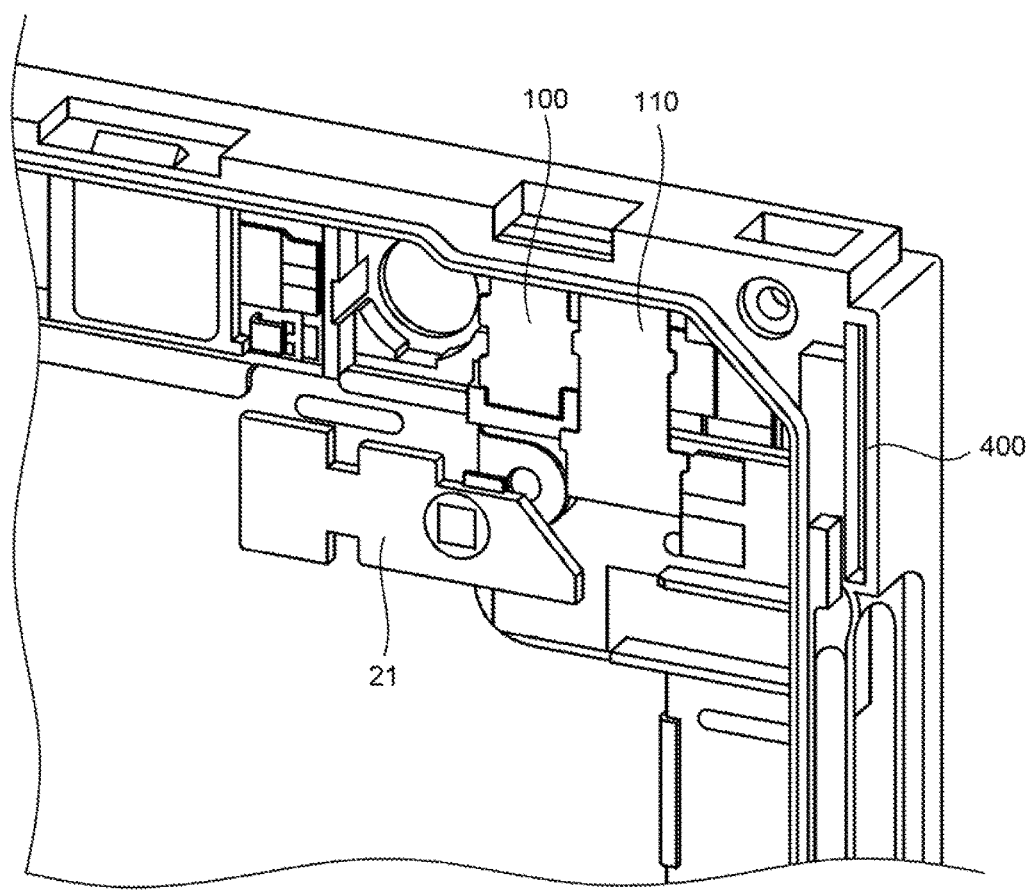
FIG. 11 is a perspective view of relation between the casing with the iris illuminating LED-mounted flexible board incorporated and a metallic holder.
Figure 12:
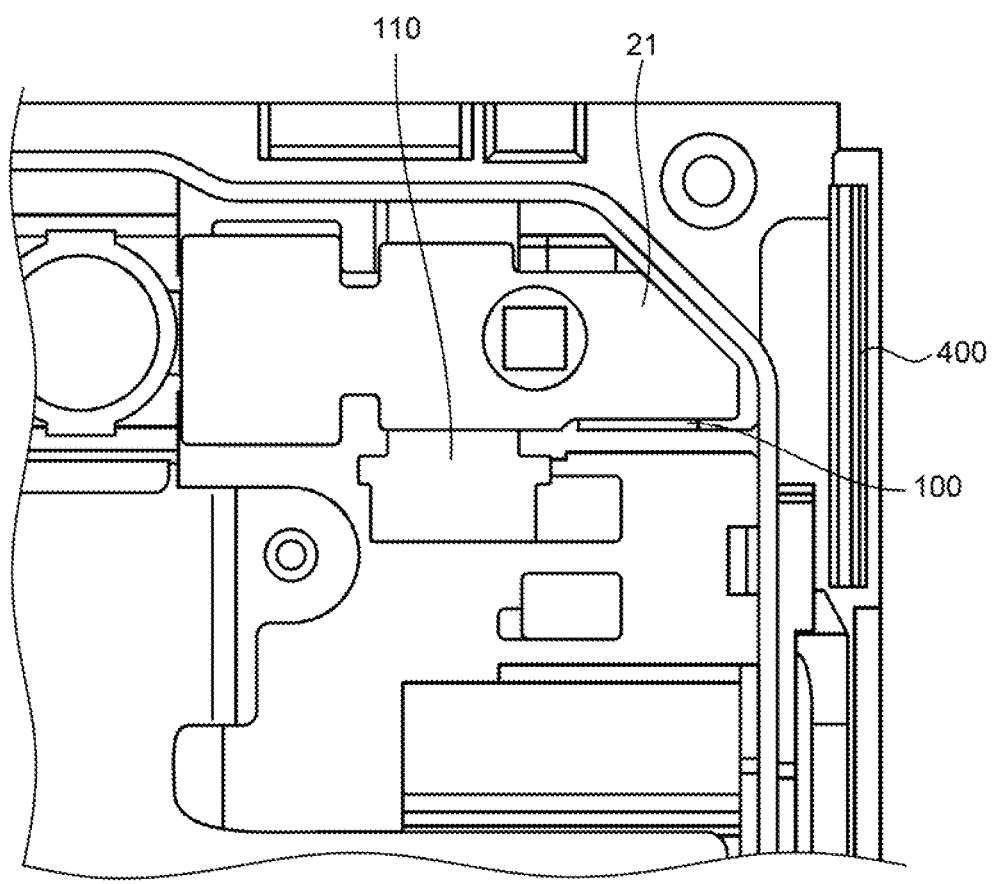
FIG. 12 is an enlarged plan view of the incorporating part with the metallic holder incorporated into the casing.

Next, a method for incorporating the iris illuminating LED-mounted flexible board 100 being in the incorporating shape into a casing 400 of the smartphone 1 will be explained with reference to FIGS. 8 through 12. FIG. 8 is an enlarged perspective view of an incorporating part of the casing before the iris illuminating LED-mounted flexible board is incorporated. FIG. 9 is a perspective view of relation between the casing and the iris illuminating LED-mounted flexible board before being incorporated. FIG. 10 is an enlarged plan view of the incorporating part with the iris illuminating LED-mounted flexible board incorporated into the casing. FIG. 11 is a perspective view of relation between the casing with the iris illuminating LED-mounted flexible board incorporated and a metallic holder. FIG. 12 is an enlarged plan view of the incorporating part with the metallic holder incorporated into the casing.

As illustrated in FIG. 8, the casing 400 has an opening 401 for fitting the iris illuminating LED 17, the proximity sensor 181, the illumination sensor 182, and the display LED 19. The other side of the opening 401 is blocked by the surface member 20. The casing 400 has slopes 402 and 403 for mounting the iris illuminating LED 17 with an angle. The slopes 402 and 403 have inclinations depending on a mounting angle of the iris illuminating LED 17. Furthermore, double-sided tapes for fixing the iris illuminating LED 17 are stuck on surfaces of the slopes 402 and 403.

As illustrated in FIG. 9, the iris illuminating LED-mounted flexible board 100 is disposed at a position so as to cause the iris illuminating LED 17, the proximity sensor 181, the illumination sensor 182, and the display LED 19 to face the casing 400. In the state in FIG. 9, the iris illuminating LED-mounted flexible board 100 is pushed into the casing 400 so that the iris illuminating LED 17, the proximity sensor 181, the illumination sensor 182, and the display LED 19 are fit into the opening 401. In this situation, the proximity sensor 181, the illumination sensor 182, and the display LED 19 are pressed against a face of the opening 401 parallel to the surface member 20 and is fixed in parallel with the surface member 20. The iris illuminating LED 17 is mounted on the slopes 402 (not illustrated in FIG. 9) and 403, has an angle with respect to the surface member 20 in accordance with the inclination, and is fixed with the double-sided tapes.

When the iris illuminating LED-mounted flexible board 100 is incorporated into the casing 400, the state illustrated in FIG. 10 is formed. Although not illustrated in this state, the iris illuminating LED 17, the proximity sensor 181, the illumination sensor 182, and the display LED 19 are disposed facing the surface member 20. In other words, the face on which the iris illuminating LED 17, the proximity sensor 181, the illumination sensor 182, and the display LED 19 are not disposed of the iris illuminating LED-mounted flexible board 100 faces the inside of the casing 400.

Furthermore, as illustrated in FIG. 11, in the present example, a metallic holder 21 is disposed at a position facing the casing 400 into which the iris illuminating LED-mounted flexible board 100 has been incorporated. The metallic holder 21 is a member for the fixation of the members and for heat radiation. In the state in FIG. 11, the metallic holder 21 is fit into the casing 400 so as to press the iris illuminating LED 17, the proximity sensor 181, the illumination sensor 182 and the display LED 19 from the back in accordance with an angle of the opening 401.

When the metallic holder 21 is incorporated from the back of the iris illuminating LED-mounted flexible board 100, the state illustrated in FIG. 12 is formed. The metallic holder 21 is fixed through fitting of hooks into the casing. With this fixation, the incorporation of the iris illuminating LED-mounted flexible board 100 into the casing 400 is completed. The metallic holder 21 corresponds to an example of a "metallic member."

Figure 13:
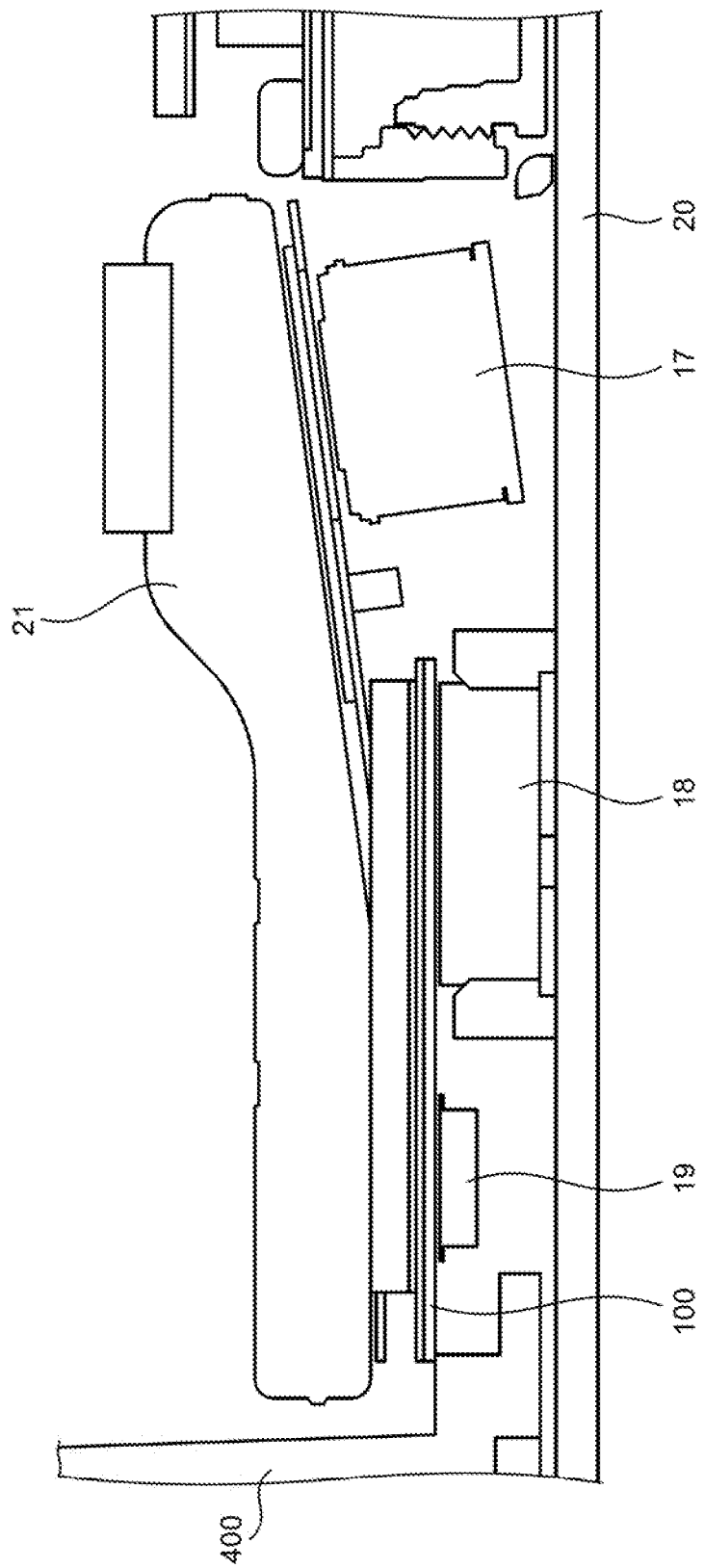
FIG. 13 is a side view of the iris illuminating LED-mounted flexible board incorporated into the casing.

FIG. 13 is a side view of the iris illuminating LED-mounted flexible board incorporated into the casing. In FIG. 13, the casing 400 is omitted for easiness of understanding. As illustrated in FIG. 13, the iris illuminating LED-mounted flexible board 100 is pressed against the surface member 20 by the metallic holder 21. With this pressing, the iris illuminating LED 17, the sensor 18, and the display LED 19 are pressed against an edge of the opening 401 of the casing 400. Consequently, the sensor 18 and the display LED 19 are held between the edge of the opening 401 and the metallic holder 21 and are fixed in parallel with the surface member 20. The iris illuminating LED 17 is held between the slopes 402 and 403 and the metallic holder 21 and is fixed with a desired angle with respect to the surface member 20. Furthermore, the metallic holder 21 covers the iris illuminating LED-mounted flexible board 100, thereby diffusing heat from the iris illuminating LED-mounted flexible board 100 also to the metallic holder 21 and hence improving a heat radiation effect.

Figure 14:
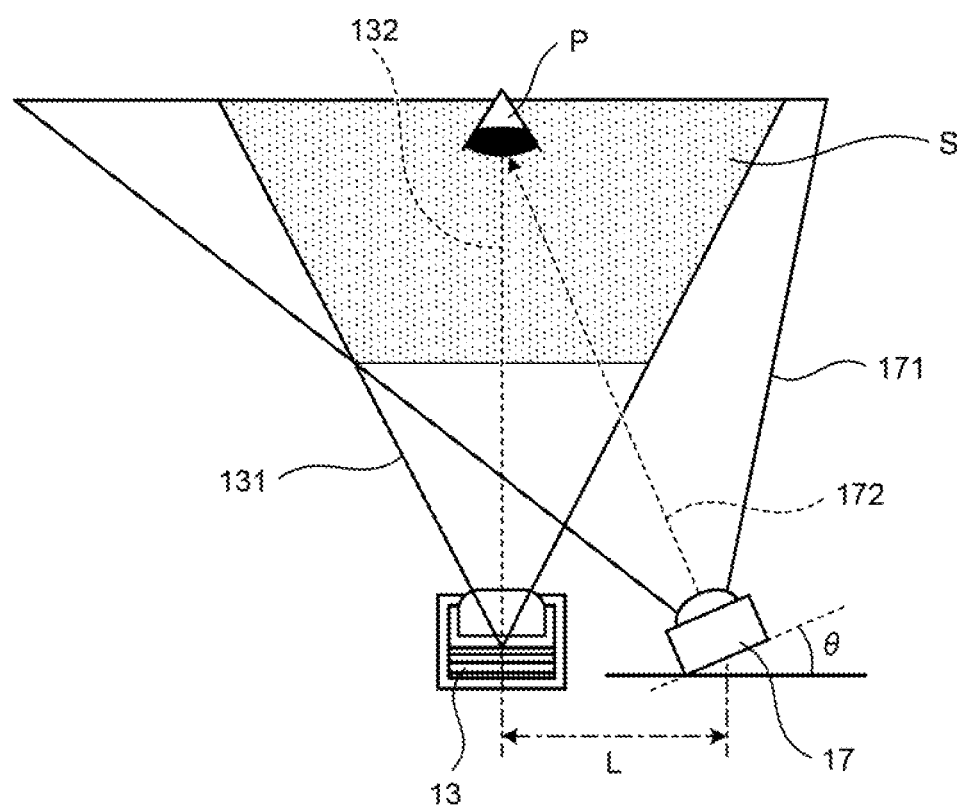
FIG. 14 is a diagram for illustrating an angle of an iris illuminating LED.

Next, the angle of the iris illuminating LED 17 will be explained with reference to FIG. 14. FIG. 14 is a diagram for illustrating the angle of the iris illuminating LED. The iris photographing camera 13 photographs an iris from the front of an eye P. In this situation, an angle of view 131 of the iris photographing camera 13 is a space in between lines extending from the iris photographing camera 13 in FIG. 14. A central axis 132 of the angle of view 131 is a line connecting between the center of the iris of the eye P and the center of a lens of the iris photographing camera 13.

Subsequently, a distance L by which no red eye occurs by the light emission of the iris illuminating LED 17 is determined. The distance L corresponds to an example of a "certain distance." It is desirable that the distance L be determined in consideration of the size of the smartphone 1, the arrangement of the other members, or the like. An angle θ of the iris illuminating LED 17 is determined so that a central axis 172 extending from the center of the iris illuminating LED 17 disposed at a position of the distance L reaches the center of the iris of the eye P. In this situation, an illumination angle 171 of the iris illuminating LED 17 is a space in between lines extending from the iris illuminating LED 17 in FIG. 14. In this case, an iris authentication space S can ensure a sufficiently large area for performing the iris authentication using the smartphone 1.

Figure 15A:
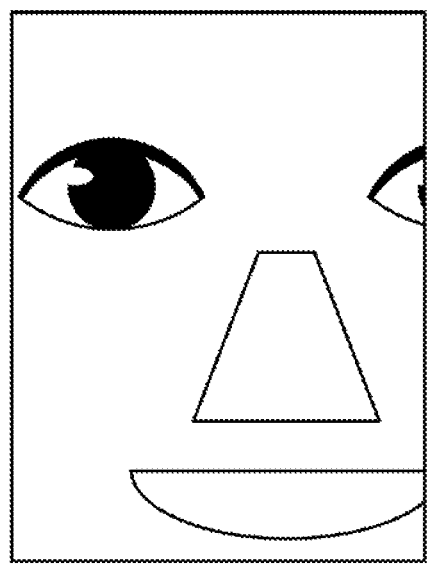
FIG. 15A is a diagram of a photographing state when an iris photographing camera is disposed so as to perform binocular iris authentication with a longitudinal direction of an angle of view positioned in a vertical direction of a face.
Figure 15B:
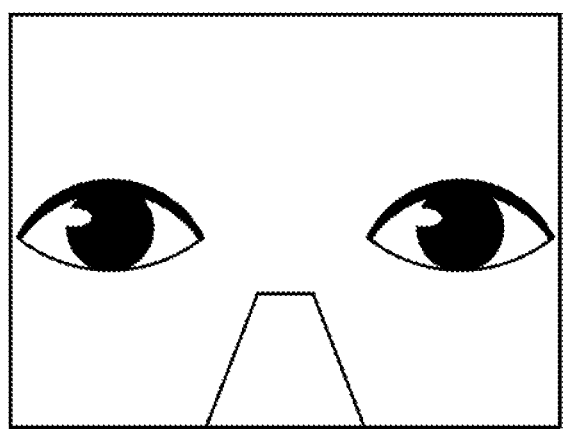
FIG. 15B is a diagram of a photographing state when the iris photographing camera is disposed so as to perform the binocular iris authentication with the longitudinal direction of the angle of view positioned in a lateral direction of the face.
Figure 16:
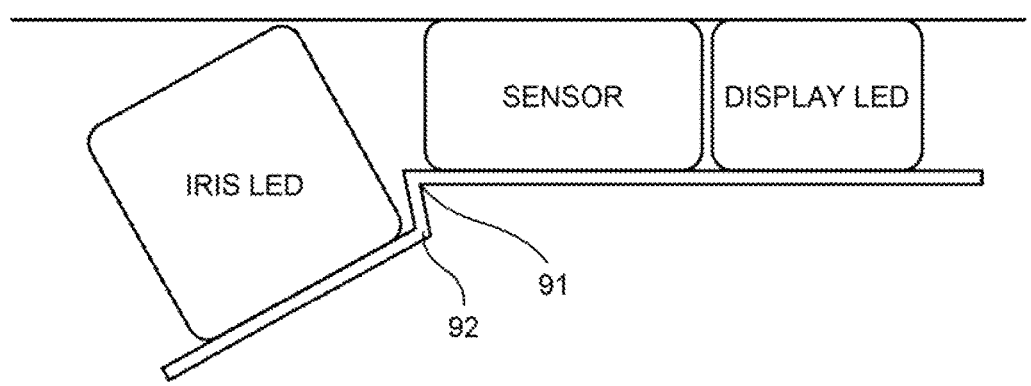
FIG. 16 is a schematic diagram of an arrangement state when bending is performed to angle the iris illuminating LED.

Furthermore, the iris photographing camera 13 in the present example is disposed so as to perform binocular iris authentication with a longitudinal direction of the angle of view positioned in a lateral direction of a face of a person to be authenticated. Iris authentication based on the arrangement of the iris photographing camera according to the present example will be explained with reference to FIGS. 15A and 15B. FIG. 15A is a diagram of a photographing state when the iris photographing camera is disposed so as to perform the binocular iris authentication with the longitudinal direction of the angle of view positioned in a vertical direction of the face. FIG. 15B is a diagram of a photographing state when the iris photographing camera is disposed so as to perform the binocular iris authentication with the longitudinal direction of the angle of view positioned in a lateral direction of the face.

In the smartphone 1, when the iris photographing camera 13 is disposed so as to perform the binocular iris authentication with the longitudinal direction of the angle of view positioned in the vertical direction of the face of the person to be authenticated, when eyes are brought close to the iris photographing camera 13 in order to perform more accurate iris authentication, one eye is out of the angle of view of the iris photographing camera 13 as in FIG. 15A. Consequently, it is difficult to perform authentication using a high-definition binocular iris image.

In contrast, in the arrangement of the iris photographing camera 13 of the present example, even when eyes are brought close to the iris photographing camera 13 to enable a large iris image to be photographed, both eyes are within the angle of view as in FIG. 15B. Consequently, the smartphone 1 according to the present example can perform the iris authentication using the high-definition binocular iris image and can perform higher-precision iris authentication.

As explained above, the iris authentication apparatus according to the present example is gentle in the bending of the flexible board for causing the iris illuminating LED to have an angle. Consequently, the repulsive force from the flexible board to the iris illuminating LED can be reduced to be small, and the iris authentication apparatus can be housed in the small-sized electronic device and can be stably fixed while ensuring the size of the iris authentication space.

The iris illuminating LED-mounted flexible board according to the present example is provided with the heat radiating vias at the mounting position of the iris illuminating LED and the heat radiating copper foil extending from the mounting position of the iris illuminating LED, and high heat radiation efficiency can be ensured. In addition, the heat radiating metallic holder covers the iris illuminating LED-mounted flexible board, thereby further increasing heat radiation efficiency. Related to this point, the iris illuminating LED passes a current of a few hundred of milliamps for light irradiation, and the iris illuminating LED itself may generate heat beyond a junction temperature of the components, which causes breakdowns. In contrast, the iris illuminating LED-mounted flexible board according to the present example can achieve high heat radiation efficiency in the confined area and can reduce the heat generation of the iris illuminating LED and avoid breakdowns even when incorporated into a confined space of a small-sized electronic device or the like.

Although the above explains a case in which the lower flexible board is connected to part of the side of the upper flexible board taking into consideration easiness of bending, the entire side of the upper flexible board may be connected. The iris illuminating LED, the sensor, and the display LED are not necessarily positioned in a straight direction as in the present example, and the iris illuminating LED and the display LED only have to be directed to the same direction with the upper flexible board bent. The upper flexible board may be connected to one side of the rectangular lower flexible board, and a part near the side facing the one side may be bent, and the iris illuminating LED may be disposed thereon, for example. In other words, it is desirable that the position of the iris illuminating LED on the lower flexible board and the position of the upper flexible board with respect to the lower flexible board be determined based on the shape of the casing into which the iris illuminating LED-mounted flexible board is incorporated, the position of the camera, or the like.

Although in the present example the face on which the iris illuminating LED is mounted of the lower flexible board is mountain folded to be bent, it may be valley folded to be bent when the position of the iris photographing camera is opposite.

An aspect of the iris authentication apparatus and the electronic device disclosed by the present application produces an effect of making it possible to be housed in a small-sized electronic device and stably fixed while ensuring the size of an iris authentication space.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An iris authentication apparatus comprising:
    a circuit mounting unit on which a circuit is mounted;
    a plate-shaped member that is in a plate shape larger than the circuit mounting unit, is connected to the circuit mounting unit by a first end, is bent so that a connecting part with the circuit mounting unit faces a face opposite to a mounting face of the circuit of the circuit mounting unit, and includes a circuit mounting area from a bend which is generated by bending an area which does not overlap with the circuit mounting unit including a second end different from the first end to the second end;
    an iris illuminating light source that is disposed on the same side as the circuit mounting unit in the circuit mounting area; and
    an image acquisition unit that is disposed at a position separated from the iris illuminating light source by a certain distance or more and acquires an image of an iris that has received light emission from the iris illuminating light source, wherein
    the image acquisition unit is disposed so that, with a longitudinal direction of an angle of view positioned in a direction in which two irises in one face are disposed, an authentication image of the two irises is capable of being acquired,
    the image acquisition unit is disposed so as to perform binocular iris authentication with a longitudinal direction of the angle of view positioned in a lateral direction of a face of a person to be authenticated, and
    even when eyes are brought close to the image acquisition unit to enable a large iris image to be photographed, both eyes are within the angle of view, wherein
    when an iris illuminating light source-mounted flexible board is bent, a repulsive force is generated in a direction opposite to a bending direction, and the bend has a small bent angle.

2. The iris authentication apparatus according to claim 1, wherein the image acquisition unit is separated from the iris illuminating light source up to a position at which no red eye occurs in the image of the iris.

3. The iris authentication apparatus according to claim 1, wherein the plate-shaped member is bent when a central axis of an angle of view of the image acquisition unit is directed to a center of an iris to be photographed so that a central axis of an illumination angle of the iris illuminating light source is directed to the center of the iris.

4. The iris authentication apparatus according to claim 1, wherein a summit of the circuit in a height direction directed from the circuit mounting unit to the circuit is positioned at or above a summit of the iris illuminating light source extending in the height direction.

5. The iris authentication apparatus according to claim 1, wherein a via is provided in the circuit mounting area.

6. The iris authentication apparatus according to claim 1, wherein the plate-shaped member includes a copper foil layer that covers an area including a side opposite to a side on which the iris illuminating light source of the circuit mounting area is disposed.

7. The iris authentication apparatus according to claim 1, wherein a face opposite to a mounting face of the iris illuminating light source of the plate-shaped member is covered with a metallic member for heat radiation.

8. An electronic device comprising:
    a circuit mounting unit on which a circuit is mounted;

a plate-shaped member that is in a plate shape larger than the circuit mounting unit, is connected to the circuit mounting unit by a first end, is bent so that a connecting part with the circuit mounting unit faces a face opposite to a mounting face of the circuit of the circuit mounting unit, and includes a circuit mounting area from a bend that is generated by bending an area that does not overlap with the circuit mounting unit including a second end different from the first end to the second end;

an iris illuminating light source that is disposed on the same side as the circuit mounting unit in the circuit mounting area; and an image acquisition unit that is disposed at a position separated from the iris illuminating light source by a certain distance or more and acquires an image of an iris that has received light emission from the iris illuminating light source, wherein the image acquisition unit is disposed so that, with a longitudinal direction of an angle of view positioned in a direction in which two irises in one face are disposed, an authentication image of the two irises is capable of being acquired, the image acquisition unit is disposed so as to perform binocular iris authentication with a longitudinal direction of the angle of view positioned in a lateral direction of a face of a person to be authenticated, and even when eyes are brought close to the image acquisition unit to enable a large iris image to be photographed, both eyes are within the angle of view, wherein when an iris illuminating light source-mounted flexible board is bent, a repulsive force is generated in a direction opposite to a bending direction, and the bend has a small bent angle.

\* \* \* \* \*